US006928587B2

(12) United States Patent
Gernhardt

(10) Patent No.: US 6,928,587 B2
(45) Date of Patent: Aug. 9, 2005

(54) DEVICE FOR ANALYZING DIGITAL DATA

(75) Inventor: Birger Gernhardt, Uhlenhorst (DE)

(73) Assignee: Tektronix International Sales GmbH, Schaffhausen (CH)

( * ) Notice: Subject to any disclaimer, the term of this patent is extended or adjusted under 35 U.S.C. 154(b) by 520 days.

(21) Appl. No.: 09/912,806

(22) Filed: Jul. 24, 2001

(65) Prior Publication Data
US 2002/0022944 A1 Feb. 21, 2002

(30) Foreign Application Priority Data

Aug. 8, 2000 (EP) .................................. 00117097

(51) Int. Cl.$^7$ ................................................ G06F 11/25
(52) U.S. Cl. ........................ 714/39; 714/37; 370/466
(58) Field of Search ............................ 714/37, 38, 39, 714/45; 370/466

(56) References Cited

U.S. PATENT DOCUMENTS

| 4,868,783 A | * | 9/1989 | Anderson et al. ........... 710/104 |
| 6,000,041 A | | 12/1999 | Baker et al. |
| 6,134,676 A | * | 10/2000 | VanHuben et al. ........... 714/39 |
| 6,198,751 B1 | * | 3/2001 | Dorsey et al. ............... 370/466 |
| 6,618,823 B1 | * | 9/2003 | West ........................... 714/25 |

OTHER PUBLICATIONS

A.S. Tanenbaum, "The Microarchitecture Level", 1999, pp 203–218.

* cited by examiner

Primary Examiner—Scott Badermann
Assistant Examiner—Anne L. Damiano
(74) Attorney, Agent, or Firm—Francis I. Gray

(57) ABSTRACT

A device for analyzing digital data formulated in accordance with a communication protocol has a data memory for storing digital data to be analyzed. A microcode memory stores a microcode that represents at least part of the communication protocol. A data register is loaded with a pre-determined number of bits from the data memory, and a microcode register is loaded with a pre-determined number of bits from the microcode memory. The content of the microcode register is used to analyze the content of the data register. The results of the analysis are stored in an output memory. An addressing unit for the data memory and another addressing unit for the microcode memory take into account the contents of the data and/or microcode registers in determining the corresponding addresses.

13 Claims, 3 Drawing Sheets

DEVICE FOR ANALYZING DIGITAL DATA

BACKGROUND OF THE INVENTION

The present invention relates to protocol analysis, and more particularly to a device for analyzing digital data which are formulated in accordance with a communication protocol.

Particularly in protocol measurement technology, the coding, decoding and analysis of digital data plays a central role, involving the examination of so-called Protocol Data Units (PDUs) by computer software and the extraction of the information they contain. Because of the great variety of protocol types and special cases, there are a correspondingly large number of variants of decoder software required for this purpose. Such decoder software reflects the specific structure of a protocol. It contains elements which control the program sequence by evaluating the data contained in a PDU, and generates a decoder output. The software particularly searches sequentially for parameters in a given PDU to unequivocally identify such parameters and to qualify contents. A decoder output is generated from the data contained in the PDUs and from the program data contained in a memory.

The disadvantage of this method, which is known from the state of the art, is that the processing of the programs for protocol decoding is very time-consuming because, regardless of the process or platform selected, a large number of command cycles have to be processed. This involves loading the protocol elements to be decoded from a RAM into a processor register. The universal data path of the processor and the inventory of commands available with it allow the manipulation of the protocol data. Accordingly, decoder results are also moved via processor commands into a target area of the RAM. Because of the quantity of data generated and the high processing speed required, PDU decoding in real time is not possible with a software decoder. Owing to the necessary storage operations and bit manipulations, program processing is too slow for this purpose when considering the quantity of parameters to be processed.

What is desired is to provide a device and/or a method for analyzing digital data formulated in accordance with a communication protocol which allows a higher processing speed than the method known from the state of the art.

BRIEF SUMMARY OF THE INVENTION

Accordingly the present invention provides a device for analyzing digital data formulated in accordance with a communication protocol that has a data memory for storing the digital data to be analyzed. A microcode memory stores a microcode that represents at least part of the communication protocol. A data register reads out a pre-determined number of bits from the data memory, and a microcode register reads out a pre-determined number of bits from the microcode memory, with the content of the microcode register being used for analyzing the content of the data register by assigning functions to the data in the data register according to the microcode section in the microcode register. The results of the analysis are entered into an output memory. Separate addressing units address the data memory and the microcode memory and are designed to take into account the content of the data register and the microcode register when the corresponding addresses are determined.

The objects, advantages and other novel features of the present invention are apparent from the following detailed description when read in conjunction with the appended claims and attached drawing.

DETAILED DESCRIPTION OF THE INVENTION

Figure 1:
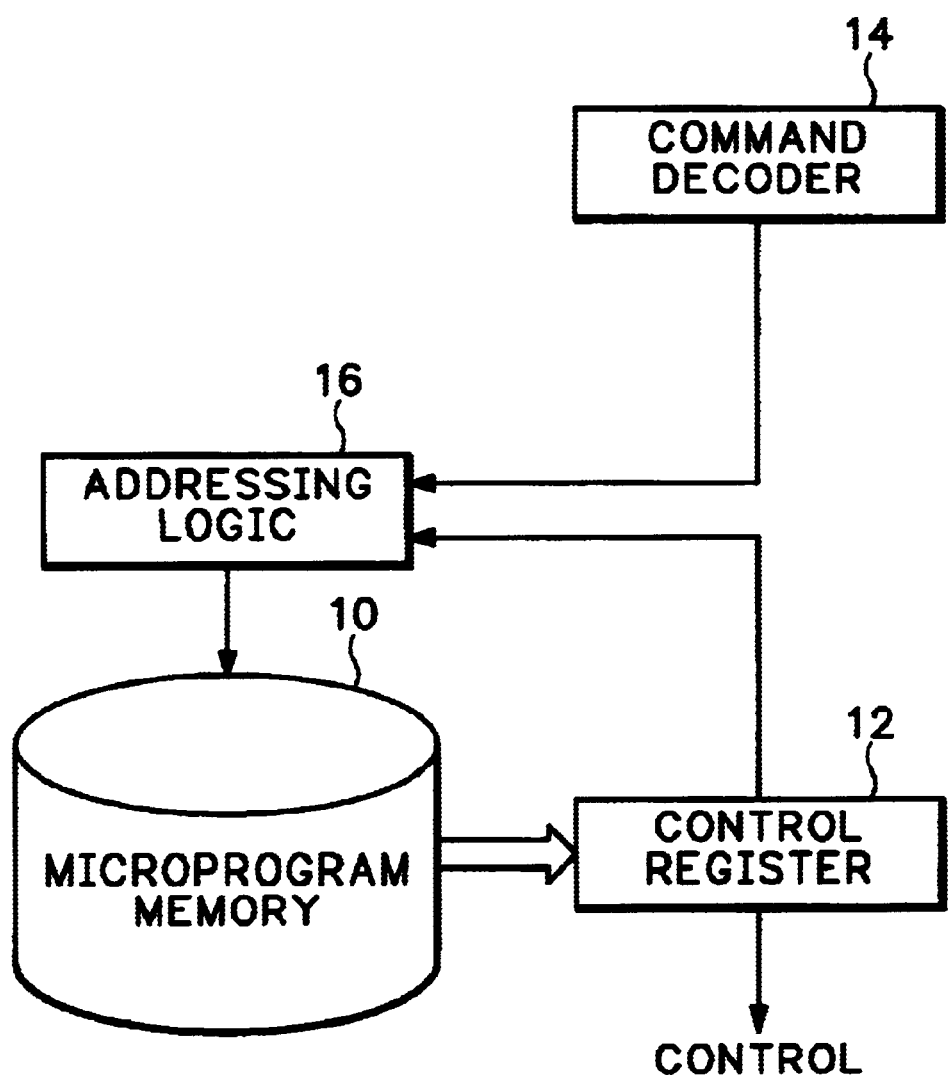
FIG. 1 is a schematic diagram view of a prior art microsequencer architecture.

FIG. 1 shows a standard microsequencer that is used in control units of Central Processing Units (CPUs). It has as characteristic components a microprogram memory 10, a control register 12, a command decoder 14 and an addressing logic 16. The central component is the microprogram memory 10 which contains information for deriving control signals for the data path, i.e., all resources for program processing in the CPU. Moreover the microprogram memory 10 contains control signals and/or data for subsequent addressing. During operation a control signal is initially active in the control register 12, which selects an address from the command decoder 14 as an entry address into the microprogram, i.e., an address in the microprogram memory 10. From this address a line from the microprogram memory 10 is loaded into the control register 12. The next address in the microprogram may now be determined directly from the new control signals and/or the subsequent address information contained in the control register 12. Alternatively the current address may be incremented, in each case dependent on the control signals used for determining the next address, which are loaded in the control register 12.

Figure 2:
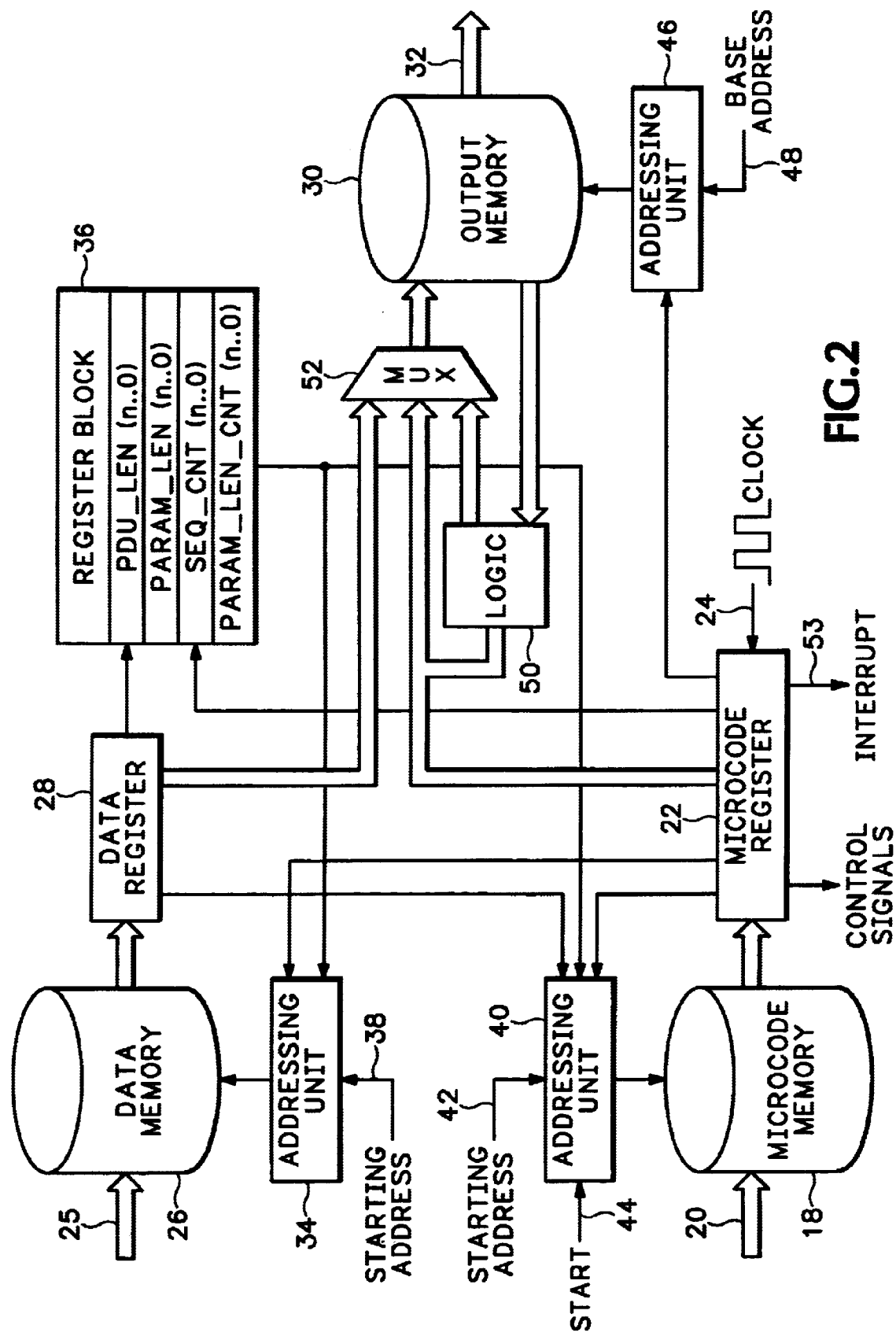
FIG. 2 is a schematic diagram view of a device for analyzing digital data according to the present invention.

The device according to the present invention for analyzing digital data, as shown in FIG. 2, adds further components to the general architecture shown in FIG. 1. The microprogram in a microprogram memory is now referenced as a microcode memory 18 which contains information on at least one communication protocol to be decoded. Particularly a tree of rules describing the protocol is represented as a microcode in the microcode memory 18. Via an input 20 the microcode memory 18 may be reloaded with other protocols and/or further needed parts of a protocol not fully loaded. This microcode memory 18 is accessed for reading only. The content of a microcode or control register 22 may be newly loaded with a clock 24. Via an input 25 the protocol data units (PDUs) to be analyzed are loaded into a data memory 26. From there the data are loaded into a data register 28 for analysis. Since the data to be analyzed may be contained in the data memory 26 across two address lines, the data register 28 is designed to shift and align the data read in. The data memory 26 also is accessed for reading only. The analysis results are entered into an output memory 30 that makes the results available at an output 32 to other units for further processing. A register block 36 has several registers and counters, the contents of which impact on subsequent addresses in the data memory 26 and/or microcode memory 18. For example a register PDU_LEN may contain the length of a PDU just analyzed in the data register 28, or a part thereof, so that once the desired parameter is found it is possible with knowledge of the length of the PDU to directly read out the next PDU from the data memory 26. In a similar way a PARAM_LEN register may serve to jump directly to the next parameter after a parameter has been found, provided that this follows from the parameter, while a SEQ_CNT register may serve to increase or decrease the addressed by predetermined values.

A first addressing unit 34 serves to address the data memory 26. It contains as an input signal control signals from the microcode register 22 and from the register block 36. An input 38 serves to enter a starting address. A second addressing unit 40 serves to address the microcode memory 18. It contains as an input signal control signals from the data register 28, the register block 36 and the microcode register 22. Moreover it has an input 42 to enter a starting address and an input 44 to enter a start signal. A third addressing unit 46 serves to address the output memory 30, and it contains as an input signal a control signal from the microcode register 22. Moreover it features an input 48 where a base address at which the storage of the analysis results is to start may be entered. The device also has a logic circuit 50 and an output multiplexer 52.

Figure 3:
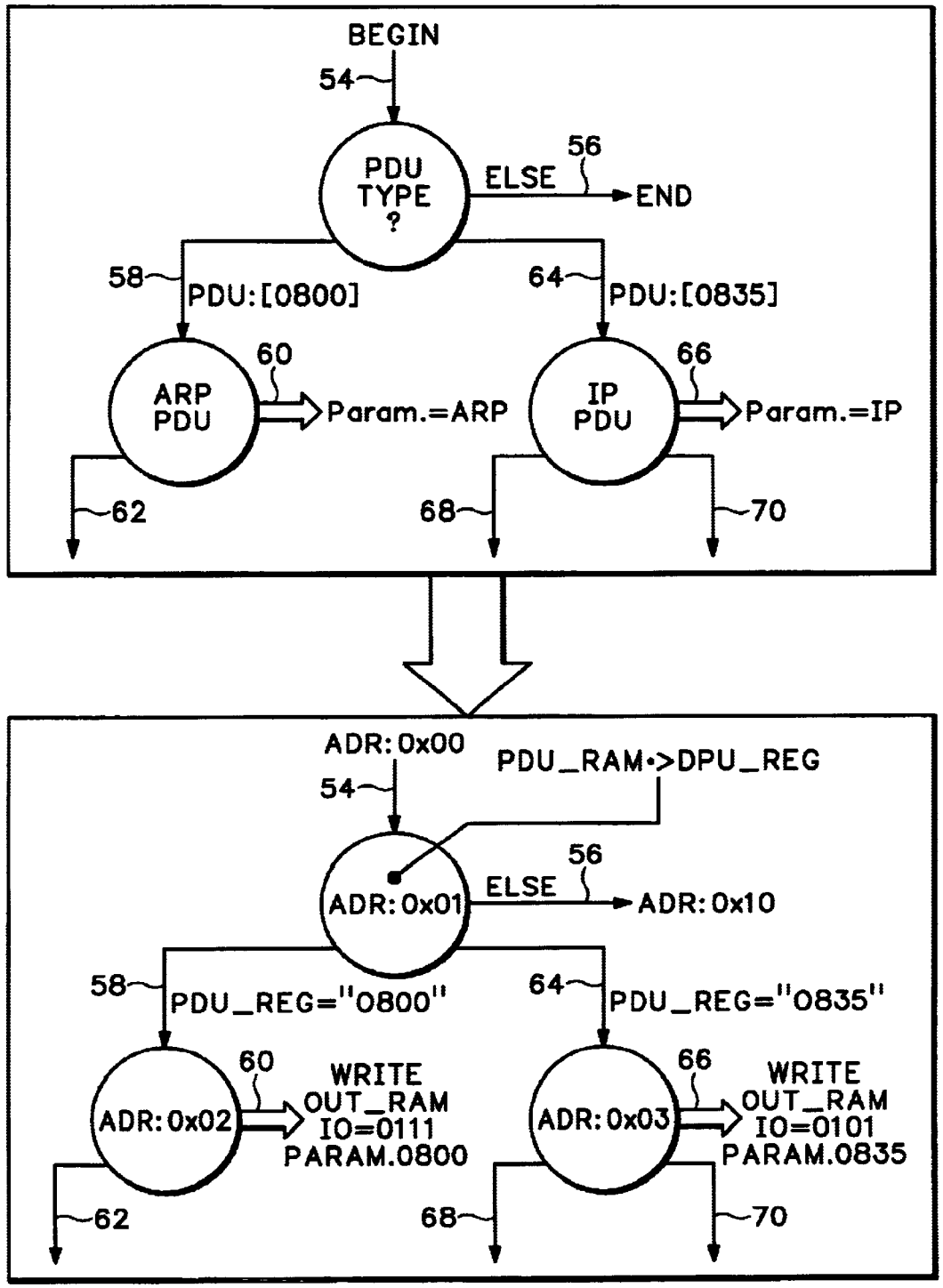
FIG. 3 is a state diagram view of the transfer of protocol rules into a microprogram.

Referring now to FIG. 3 an example is shown of how protocol rules may be transferred into a microprogram. The top half of FIG. 3 represents a tree of rules to be implemented, while the bottom half shows the corresponding microprogram. In the tree of rules after entry via a start command "BEGIN" in step 54 the question arises as to which type of PDU this is. Two particular PDU types are of interest so, if it is neither of the two, the analysis is ended in step 56. If PDU:[0800] is found in step 58, the PDU is of the ARP type. The PDU type, also determined as a parameter, delivers ARP as a result in step 60. With the PDU type known, the PDU is checked in the following step 62 for the presence of other parameters and, if such other parameters are found, their value is determined. In case the PDU is a PDU:[0835] in step 64, it is of the IP type, and the PDU type parameter in step 66 is determined to be IP. Depending on the analysis criteria, it may be of interest to determine further PDU parameters in step 68, in particular their values. However it may be of interest in step 70 to analyze the next PDU.

In the microprogram realization shown in the bottom half of FIG. 3 corresponding steps are described using corresponding reference numerals. The underlying basic principle is that conditions in the tree of rules are assigned addresses in the microcode memory 18. So entry into the analysis is via the address ADR:0x00, and the investigation to determine which PDU type it is takes place at address ADR:0x01. If none of the PDU types of interest is found, the program ends at address ADR:0x10. In case the presence of a PDU:[0800] type is established, further analysis takes place at address ADR:0x02, with the determined parameter identifier ID=0111 being entered into the output memory 30, as is the parameter value PARAMETER=800, which has been determined. Further processing in step 62 occurs at the next subsequent address. The alternative path 64 leads to address ADR:0x03, which in step 66 also ends with a parameter identifier and a parameter value being entered into the output memory 18, while further processing steps 68, 70 are initiated by jumping to further following addresses.

The components shown in FIG. 2 interact according to the tree of rules in the microprogram as follows. The start of a decoding process is initiated via a "Start" signal at input 44 of the second addressing unit 40. This causes starting addresses to be loaded into the first and second addressing units 34, 40, or optionally a base address into the third addressing unit 46. In this way the device becomes aware of the address at which the PDU data in the PDU data memory 26 that are to be analyzed commence, and where the entry into the microcode that is stored in the microcode memory 18 occurs. On the basis of the starting addresses, the microcode register 22 and the data register 28 are loaded from the associated memories 18, 26 for the first time. The data in the data register 28 are assigned functions according to the microcode section in the microcode register 22, for example that certain bits specify the PDU type, certain bits a parameter identifier, and other bits a value for a certain parameter. The result of the analysis is entered into the output memory 30 via the output multiplexer 52. Results determined that may have an effect on subsequent addresses, such as the length of the PDU, the length of the parameter, predetermined jumps to subsequent addresses, are entered in register block 36. Next the relevant subsequent address is determined, taking into account the contents of the register block 36, the microcode register 22 and the data register 28 in the addressing units 34, 40, 46. After that with regard to the new current addresses the microcode register 22 and the data register 28 are again loaded from the microcode memory 18 or the data memory 26 respectively. This is followed by another analysis step during which the results are entered into the output memory 30, and the current subsequent addresses of the addressing units 34, 40, 46 are calculated.

As shown in FIG. 2 entry of the results into the output memory 30 occurs line-by-line, with the line contents gradually being filled. When there is a new result, entries already made are read out from the output memory 30, linked with the new results in the logic circuit 50, and then rewritten into the output memory by the output multiplexer 52. Following the completion of the analysis an interrupt occurs at the output 53 of the microcode register 22. Subsequent addressing now points continuously to the current address in the microcode memory 18. In this way the "interrupt" control signal at the output 53 remains active until a new decoding process is started by a "Start" signal at input 44.

With respect to further processing, the results are preferably structured in the form of an index field which indicates first of all whether a corresponding parameter is contained in the PDU and then, provided a parameter exists, the corresponding parameter value. By incrementing the third addressing unit 46 from PDU to PDU by a fixed value, it is possible to read out the data of interest from the output memory 30 within a very short time.

In the preferred embodiment the first and second addressing units 34, 40 each contain at least one counter that may be modified in accordance with the content of the data register 28 and/or the microcode register 22 when the addresses are determined. This makes it possible to jump straight to subsequent addresses in the respective memories 26, 18, depending on the relevant register contents. The data register 28 is preferably designed such that its content may be aligned or shifted. This makes it possible to reliably analyze even data in PDUs that extend across two addresses, such as from the end of a first address to the beginning of a second address. The register block 36 takes account of the contents of the data register 28 and/or the microcode register 22 of preceding points in time, which are decisive for the addresses. If a PDU extends across several addresses and the parameter searched for has already been found, it is possible from the length of the relevant PDU filed in the register block 36 to jump directly to the next address of interest which indicates the beginning of the next PDU. The third addressing unit 46, having a changeable address and taking the content of the microcode register 22 into account, allows writing the results not only serially into the output memory 30, but already in a form that is particularly advantageous for further processing, such as first a list of the parameter identifiers and then a list of the associated parameter values. In case the content of the output memory 30 is updated in steps, and existing line entries in particular are updated in respect of new analyzing results, it is particularly advantageous for the device to have the logic circuit 50 with which an entry of the output memory is read out, changed to take account of the new result, and rewritten into the output memory. For the start of an analysis in which a higher level system may define the entry address into the microprogram, it is particularly advantageous that the addressing units 34, 40, 46 are designed such that a starting address may be loaded into them. At least two of the memories 18, 26,30 may be combined in one physical memory, and the associated addressing units 34, 40, 46 also may be combined into a single physical addressing unit.

Thus the present invention achieves an enhanced performance compared with a pure software variant by using a hardware decoder for the analysis of digital data, particularly for the decoding of protocol data. This is realized as a microsequencer architecture which makes it possible to decode protocol data within a system cycle and generate the associated output. Such hardware may be configured universally so that PDUs of different protocol types may be decoded.

What is claimed is:

1. A device for analyzing digital data formulated in accordance with a communication protocol, comprising:
   a. a data memory for storing the digital data to be analyzed;
   b. a microcode memory for storing a microcode that represents at least part of the communication protocol;
   c. a data register for reading out a pre-determined number of bits from the data memory;
   d. a microcode register for reading out a pre-determined number of bits from the microcode memory, with the content of the microcode register being usable for analyzing the content of the data register;
   e. an output memory into which the results of the analysis are entered;
   f. a first addressing unit for addressing the data memory; and
   g. a second addressing unit for addressing the microcode memory, with the first and second addressing units being designed to take into account the content of the data register and/or the microcode register when subsequent addresses are determined.

2. The device according to claim 1 wherein the first and second addressing units each comprise at least one counter that may be changed in accordance with the content of the data register and/or microcode register when the subsequent addresses are determined.

3. The device according claim 1 wherein the data register is designed to align and/or shift its content.

4. The device according to claim 1, 2 or 3 further comprising a register block with at least one register and at least one counter, the contents of which are taken into account for determining the subsequent addresses for the first and second addressing units, the at least one register and the at least one counter being used to take into account the contents of the data register and/or the microcode register.

5. The device according to claim 4 further comprising a third addressing unit for the output memory, with the address of the third addressing unit being changeable by taking the content of the microcode register into account.

6. The device according to claim 5 further comprising a logic circuit with which an entry into the output memory is read out, changed to take into account a new result, and rewritten into the output memory.

7. The device according to claim 6 wherein a starting address is loaded into the addressing units.

8. The device according to claim 7 where the digital data to be analyzed are protocol data units that contain parameters, and the results entered into the output memory have at least one parameter identifier and at least one parameter value.

9. The device according to claim 8 wherein at least two of the memories are combined in one physical memory, and the corresponding addressing units are combined in one physical addressing unit.

10. A method of analyzing digital data formulated in accordance with a communication protocol comprising the steps of:
    a. loading the digital data to be analyzed into a data memory;
    b. loading a microcode into a microcode memory, with the microcode representing at least part of the communication protocol;
    c. reading out a pre-determined number of bits from the data memory into a data register in accordance with an address specified by a first addressing unit;
    d. reading out a pre-determined number of bits from the microcode memory into a microcode register in accordance with an address specified by a second addressing unit;
    e. assigning functions to the data bits in the data register according to the microcode bits in the microcode register;
    f. entering at least one result of the assignment in an output memory; and
    g. updating counter readings for the first and second addressing units in accordance with the content of the data register and/or the microcode register.

11. The method according to claim 10 wherein the entry in accordance with step f) takes place at an address specified by a third addressing unit, with a counter reading for the third addressing unit being updated in accordance with the content of the microcode register.

12. The method according to claim 11 wherein prior to entry in accordance with step f) an incomplete entry is read out from the output memory by a logic circuit and changed to take into account a new result, and then rewritten into the output memory.

13. The method according to claim 10, 11 or 12 comprising in a further step a register block containing at least one register and at least one counter which is loaded with the results of the analysis and which are taken into account when subsequent addresses are determined for the first and second addressing units.

* * * * *